J. LISKA.
NON-SKID VEHICLE WHEEL.
APPLICATION FILED MAR. 16, 1914.
1,102,598.
Patented July 7, 1914.
2 SHEETS—SHEET 1.
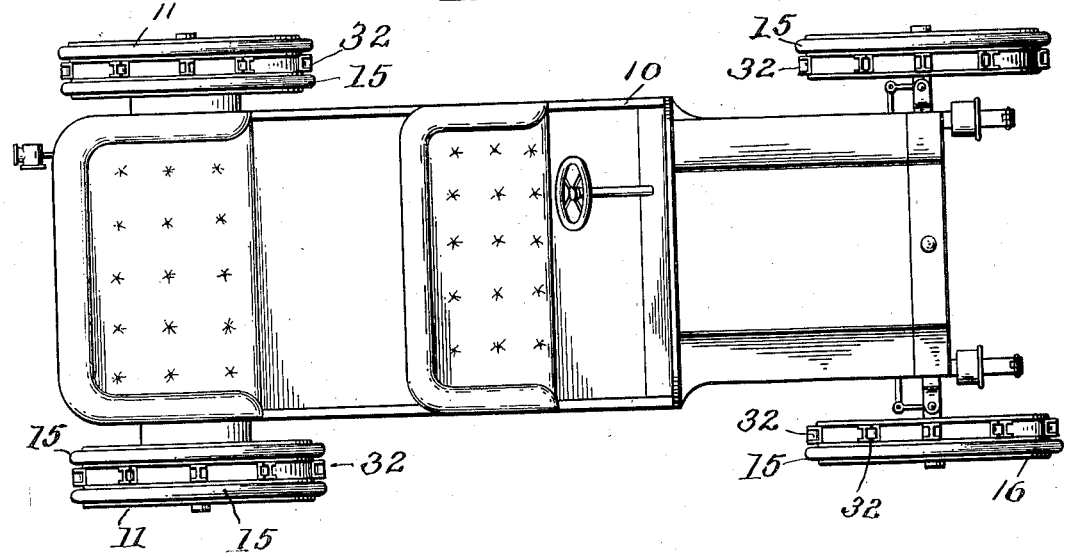
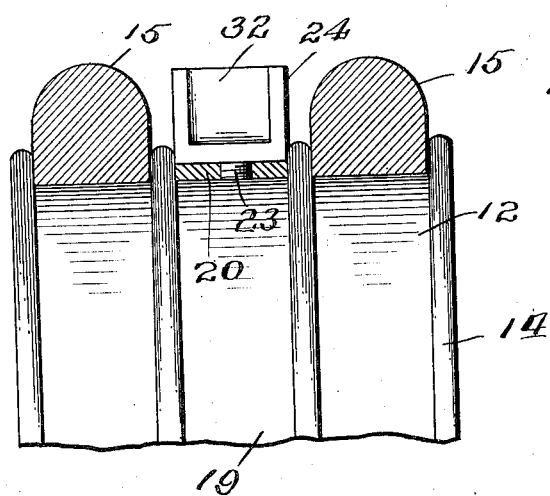
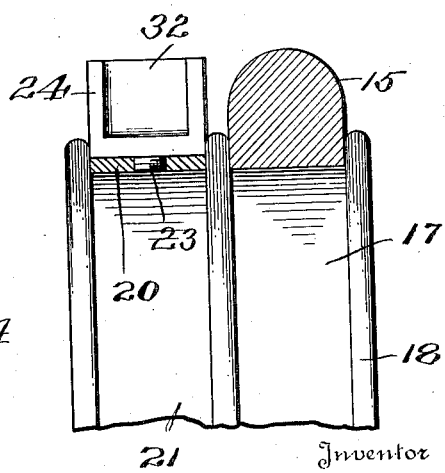
Witnesses
Jos. A. Ryan
T. L. Bryant
Inventor
John Liska
By A. M. Wilson
Attorney

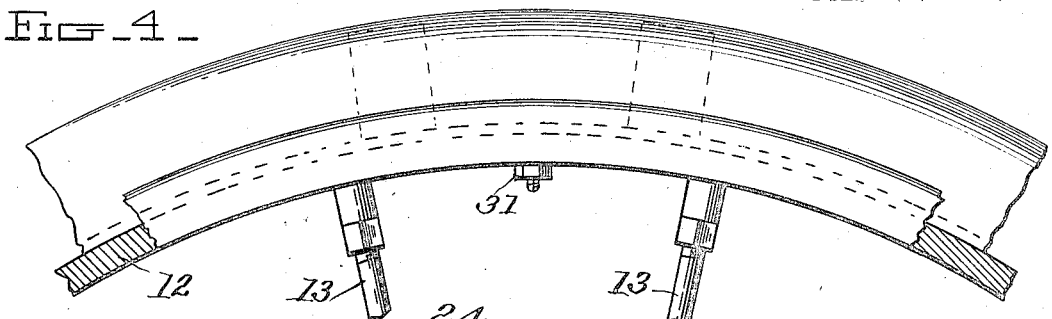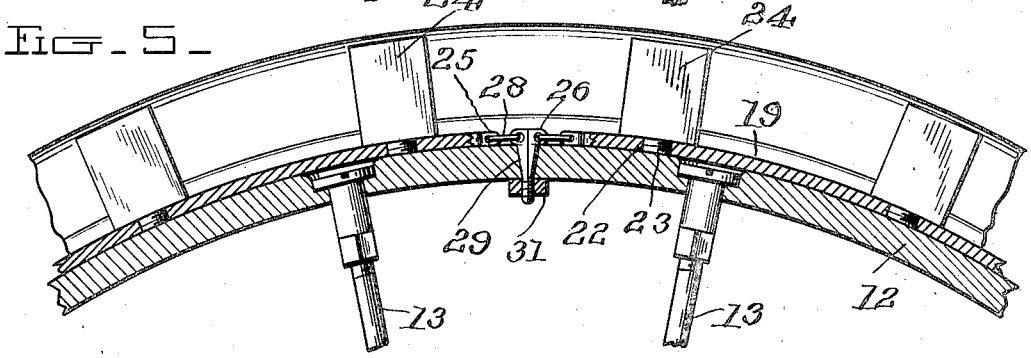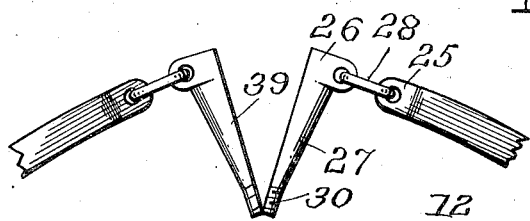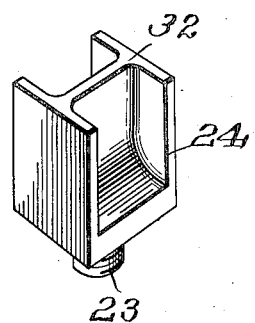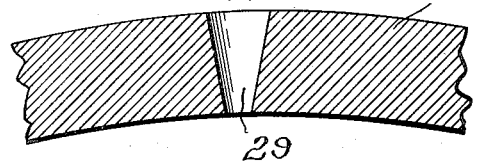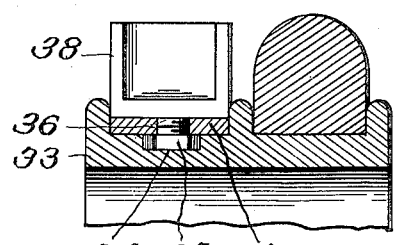

UNITED STATES PATENT OFFICE.

JOHN LISKA, OF NATRONA, PENNSYLVANIA, ASSIGNOR OF ONE-HALF TO ANDY KLAPAN, OF NATRONA, PENNSYLVANIA.

NON-SKID VEHICLE-WHEEL.

1,102,598.   Specification of Letters Patent.   Patented July 7, 1914.

Application filed March 16, 1914. Serial No. 825,057.

*To all whom it may concern:*

Be it known that I, JOHN LISKA, a subject of the Emperor of Austria-Hungary, residing at Natrona, in the county of Allegheny and State of Pennsylvania, have invented certain new and useful Improvements in Non-Skid Vehicle-Wheels, of which the following is a specification.

This invention relates to new and useful improvements in non-skid vehicle wheels.

The primary object of the invention is to provide a removable calk carrying means mounted upon the wheel rim or felly adjacent to the resilient tread members carried thereby.

A further object is to provide in connection with a vehicle rim having one or more resilient tires mounted thereon, of a removable calk carrying band positioned upon the rim and having a plurality of calks removably positioned upon the band.

A still further object is to provide a calk carrying band upon a wheel rim so positionable upon the rim as to lock the removable calks fixedly upon the band and at points at the side of the tread portion of the resilient tread means of the wheel.

With these general objects in view and others that will appear as the nature of the invention is better understood, the same consists in the novel combination and arrangement of parts hereinafter fully described, illustrated in the accompanying drawings and pointed out in the appended claims.

In the drawings forming a part of this application and in which like designating characters refer to corresponding parts throughout the several views: Figure 1 is a plan view of an automobile illustrating two forms of wheels, each of the same employing my device thereon. Fig. 2 is a front elevation of a portion of the form of rear wheel shown in Fig. 1 and with the calk band and cushion tires shown in vertical transverse section. Fig. 3 is a similar view of one of the front wheels constructed as shown in Fig. 1. Fig. 4 is a side elevation of a portion of one of the rear wheels partly broken away and illustrating the calks in dotted lines. Fig. 5 is a longitudinal central sectional view taken through the calk band of one of the wheels and showing the calks and the opposite cushion tire in side elevation. Fig. 6 is a detail view of the end securing means for the calk strip. Fig. 7 is a perspective view of one of the removable calks, and Fig. 8 is a transverse vertical sectional view taken through a rim and the cushion tire and calk band thereon, illustrating a different manner of securing the calks to the band.

Referring more in detail to the drawings, the automobile 10 is illustrated with rear wheels 11 formed of a rim 12 having spokes 13 while the periphery of the rim is provided with a plurality of parallel annular ribs 14 adapted to position cushion tires 15 therebetween and mounted upon said rim after the usual manner. The front wheels 16 are illustrated as comprising the rims 17 having similar annular parallel bands 18 for receiving similar cushion tires.

The present invention resides in substituting a calk carrying band in place of any desired one of the cushion tires employed upon this form or similar forms of vehicle wheels and in the present instance it will be seen that upon the rear wheels, the central annular seat 19 of the rim is provided with the annular calk band 20 while in the front wheel construction one of the side seats and preferably the inner annular seat 21 is provided with one of the said carrying bands 20, while it is obvious that provision may be made for placing the calk band in any desired one or all of the annular seats, three of which are illustrated in the rear wheel construction while only two are set forth in the front wheels.

The calk band 20 consists of a metallic strip provided at desired intervals with threaded perforations 22 adapted for the reception therein of the threaded shanks 23 of the calks 24. The adjacent free ends of the strip being provided with perforations 25, said ends are attached to the heads 26 of wedging plugs 27 by means of links 28, while the adjacent faces 39 of the plugs are flattened for contacting the plugs together. A tapered perforation 29 through the wheel rim is adapted to receive the plug members 27 which are adapted to be wedged therein thus drawing the strip ends toward each other as best illustrated in Fig. 6, while the coöperating plugs 27 unitedly form a single tapered plug fitting within the perforation 29 and having its bottom portions 30 screw-threaded is adapted to receive thereon a turn nut 31, the tightening of which draws the composite plug closely within the perforation thus locking the calk strip upon its annular seat with its free ends in fixed relations. In either of the illustrated forms of wheels therefore the application of this calk band will be at once apparent in that having the band 20 provided with a plurality of calks 21 removably mounted thereon, the band is positioned within the desired annular seat and its terminal wedge plugs 27 united and forced into the perforations 29 of the rim and there securely locked by the turn nut 31, when the calks will be firmly seated and as herein illustrated having their tread faces 32 slightly beneath the level of the tread of the adjacent cushion tire members and whereby the depressing of the cushion tires allows the adjacent calks to engage the road-bed for the prevention of side slipping and skidding as well as affording added efficiency in the road-bed traction qualities of the wheel.

In the form of calk mounting shown in Fig. 8, it is designed to have the wheel rim 33 provided with open sockets 34 to receive the heads 35 of bolt members 36, which bolt members are screw-threaded through the strip 37 and into the base of the calk 38. With this latter construction the other elements heretofore described are employed, the variation only consisting in substituting the mounting bolt 36 for the threaded shank 23 and in providing the rim sockets 34 to position such bolt heads. In this structure shown in Fig. 8, it will be seen that the socketing of the bolt heads gives added efficiency to the device in assisting the wedge plugs to prevent the calk strip from longitudinally slipping or sliding upon the face of the annular seat within which it is mounted.

While the forms of the invention herein shown and described are what are believed to be preferable embodiments thereof, it is nevertheless to be understood that minor changes may be made in the form, proportion and details of construction without departing from the spirit and scope of the invention as set forth in the appended claims.

What is claimed as new is:—

1. In combination with a wheel rim having annular peripheral seats, a calk band positioned within one of said seats and provided with perforations therethrough, calks outwardly projecting and secured in said perforations, coöperating wedge plugs flattened on their inner sides and having perforated heads, links connecting said heads to the free ends of said band, said plugs being tapered and having their smaller ends screw-threaded, said rim provided with a tapered perforation therethrough adapted for the reception of said plugs with their threaded ends projecting therefrom, and a lock nut mounted upon said threaded ends.

2. In combination with a wheel rim having parallel annular ribs therearound forming an intermediate annular seat, of a metallic strip positionable upon said seat, a plurality of outwardly extending calks upon said strip, coöperating wedge plugs linked to the free ends of said strip and unitedly forming a tapered plug, said rim provided with a tapered perforation therethrough adapted for the wedging reception of said tapered plug and locking means mounted upon the projecting end of said plug and engaging the inner face of said rim.

3. A device of the class described comprising a wheel rim, annular peripheral ribs carried thereby, a cushion tire positioned upon said rim and seated between two adjacent ones of said ribs, a metallic strip seated upon said rim between two of said ribs, calks carried by said strip and outwardly projecting a less distance than said tire, a tapered perforation through said rim positioned centrally between the strip positioning ribs, separate flat faced plugs linked to the free ends of said strip and unitedly forming a tapered plug receivable within said perforation with projecting ends lying inwardly of the rim, a lock nut screw-threaded upon said projecting ends.

4. A device of the class described comprising the rim having annular seats, a cushion tire positioned in one of said seats, a metallic strip seated in another one of said seats, the strip receiving seat provided with a plurality of sockets, headed bolts secured through said strip and having their heads adapted for reception within said sockets, calks mounted upon said strip and secured to said bolts, and a plug tensioning device for retaining said strip upon said rim and coöperating with said bolts to hold said strip against peripheral movement.

In testimony whereof I affix my signature in presence of two witnesses.

JOHN LISKA.

Witnesses:
 JOHN KEPKO,
 JOSEF KRALIK.